US010339363B2

(12) United States Patent
Lee et al.

(10) Patent No.: US 10,339,363 B2
(45) Date of Patent: Jul. 2, 2019

(54) APPARATUS AND METHOD USING OPTICAL SPECKLE

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Jaesoong Lee, Suwon-si (KR); Byoungho Lee, Seoul (KR); Youngmo Jeong, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/496,156

(22) Filed: Apr. 25, 2017

(65) Prior Publication Data
US 2018/0060639 A1 Mar. 1, 2018

(30) Foreign Application Priority Data

Aug. 24, 2016 (KR) ........................ 10-2016-0107778

(51) Int. Cl.
G06K 9/00 (2006.01)
G06K 9/62 (2006.01)
G06F 21/32 (2013.01)

(52) U.S. Cl.
CPC ....... *G06K 9/0012* (2013.01); *G06K 9/00013* (2013.01); *G06K 9/00087* (2013.01);
(Continued)

(58) Field of Classification Search
CPC ............ G06K 9/00087; G06K 9/0012; G06K 9/0004; G06K 9/00013; G06K 9/00899;
(Continued)

(56) References Cited

U.S. PATENT DOCUMENTS 4,862,894 A * 9/1989 Fujii .................... A61B 5/0064
600/479
5,588,437 A * 12/1996 Byrne .................. A61B 5/0261
600/479
(Continued)

FOREIGN PATENT DOCUMENTS

EP 2 842 489 A1 3/2015
JP 3516945 B2 4/2004
(Continued)

OTHER PUBLICATIONS

Communication issued by the European Patent Office dated Dec. 12, 2017 in counterpart European Patent Application No. 17172385.1.

Primary Examiner — Jingge Wu
(74) Attorney, Agent, or Firm — Sughrue Mion, PLLC

(57) ABSTRACT

Provided are apparatuses and methods using an optical speckle. An apparatus may include a light source configured to emit coherent light to an object and an imaging device configured to photograph a speckle pattern generated on the object by the coherent light. The apparatus may also include a processor having a function of determining whether the object is a living body or a non-living body by measuring a contrast of the speckle pattern. The processor may be configured to determine whether the object is a living body or not by comparing the contrast of the speckle pattern with a threshold contrast or a reference contrast previously registered by a user. The apparatus may be used by being applied to a fingerprint recognition system.

22 Claims, 19 Drawing Sheets

(52) U.S. Cl.
CPC ........ *G06K 9/00114* (2013.01); *G06K 9/6202* (2013.01); *G06F 21/32* (2013.01); *G06K 2009/0006* (2013.01)

(58) Field of Classification Search
CPC ....... G06K 9/00107; G06K 2009/0006; G06K 9/00114; G06K 2009/00932; G06K 9/00885; G06K 2009/00939; G06K 9/00067; G06K 9/00892; G06K 9/00006; G06K 9/00604; G06K 9/00617; G06K 9/00906; G06K 9/2018; G06K 9/6267; G06K 7/10831; G06K 9/00536; G06K 9/0061; G06K 9/00926; G06K 9/6202; A61B 5/1172; A61B 5/6826; A61B 8/0858

See application file for complete search history.

(56) References Cited

U.S. PATENT DOCUMENTS

| | | |
|---|---|---|
| 6,518,083 B2 | 2/2003 | Sato et al. |
| 7,925,056 B2 | 4/2011 | Presura et al. |
| 9,704,050 B2* | 7/2017 | Lee .................. G06K 9/00577 |
| 2005/0190157 A1* | 9/2005 | Oliver .................. G06F 3/0304 345/166 |
| 2007/0177772 A1* | 8/2007 | Fujii .................. G06K 9/00114 382/115 |
| 2007/0253607 A1* | 11/2007 | Higuchi ............. G06K 9/00026 382/124 |
| 2007/0263906 A1 | 11/2007 | Fujii et al. |
| 2008/0037001 A1* | 2/2008 | Yokoyama ........... A61B 5/0059 356/51 |
| 2008/0260211 A1* | 10/2008 | Bennett .................... G06K 9/00 382/115 |
| 2010/0168585 A1* | 7/2010 | Fujii .................... A61B 5/0261 600/476 |
| 2011/0026783 A1 | 2/2011 | Fujii et al. |
| 2012/0218397 A1* | 8/2012 | Monden ............... G06K 9/0012 348/77 |
| 2015/0049178 A1 | 2/2015 | Dunn et al. |
| 2016/0012291 A1* | 1/2016 | Cleland ............... A61B 3/1233 382/117 |
| 2016/0113504 A1 | 4/2016 | Rege et al. |
| 2016/0352066 A1* | 12/2016 | Redding ........... H01S 3/094007 |
| 2017/0124370 A1* | 5/2017 | He ...................... G06K 9/0012 |

FOREIGN PATENT DOCUMENTS

| | | |
|---|---|---|
| JP | 3903188 B2 | 4/2007 |
| KR | 10-1069255 B1 | 10/2011 |

* cited by examiner

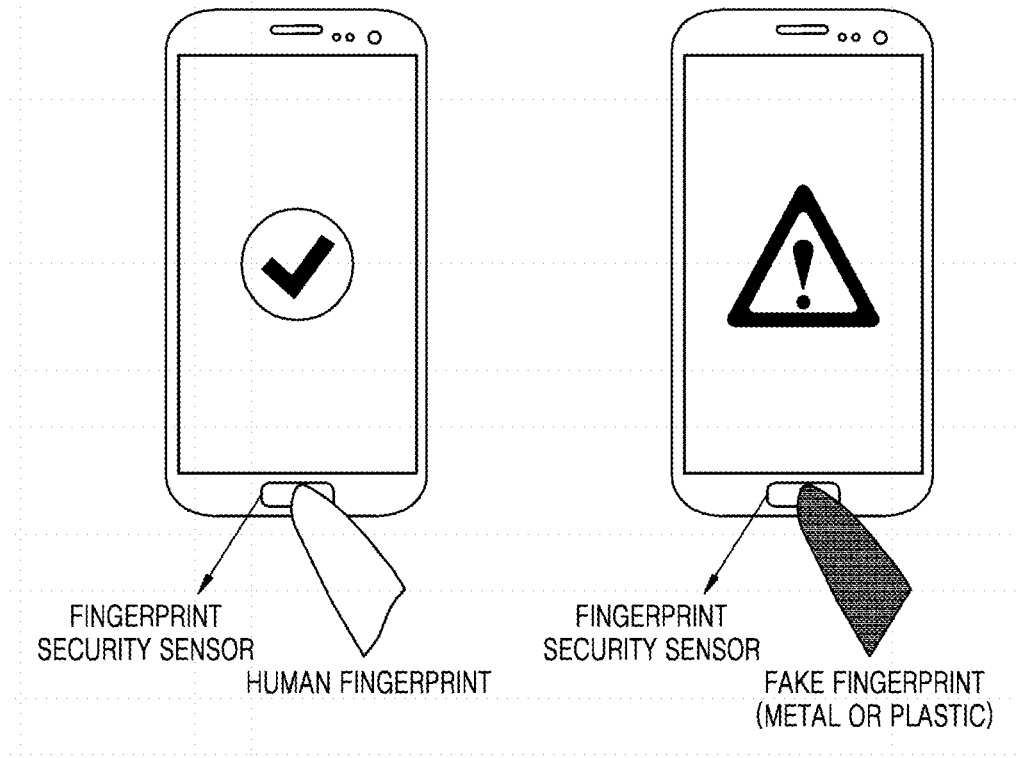

FIG. 17
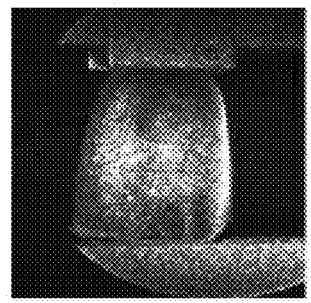 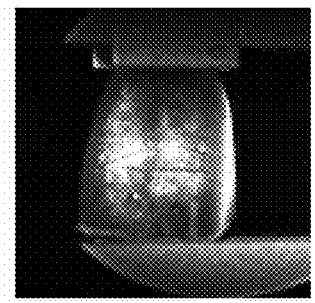
f/16  f/1.8

FIG. 21
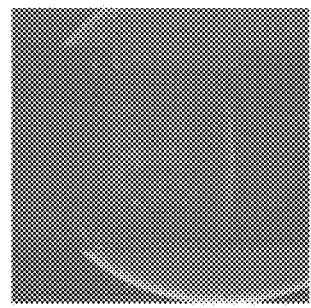
10 mA
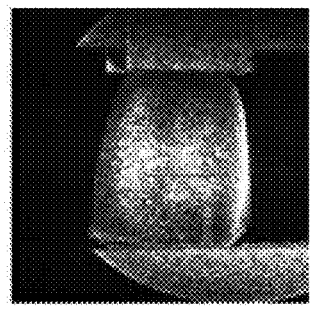
36 mA

APPARATUS AND METHOD USING OPTICAL SPECKLE

CROSS-REFERENCE TO RELATED APPLICATION

This application claims priority from Korean Patent Application No. 10-2016-0107778, filed on Aug. 24, 2016 in the Korean Intellectual Property Office, the disclosure of which is incorporated herein in by reference its entirety.

BACKGROUND

1. Field

Apparatuses and methods consistent with exemplary embodiments relate to optical measurement and evaluation with respect to an object.

2. Description of the Related Art

Fingerprint security systems provide security by storing living body fingerprint patterns by using light sources, and comparing newly provided fingerprint patterns with the stored fingerprint patterns. A variety of algorithms related to fingerprint security are present according to which properties of fingerprint patterns are in use.

However, security technologies using fingerprints commonly use information about fingerprints of an uneven shape by converting the information into two-dimensional information. Accordingly, a problem arises in that security technologies using fingerprints may be disabled simply with two-dimensional information identical to a living body fingerprint pattern. Such a problem may be common in fingerprint security systems in which a fingerprint pattern is two-dimensionally imaged by using a light source. Also, it is possible that a security system measuring an electrostatic capacity due to protrusions and depressions of a fingerprint could be disabled by a method of copying a fingerprint pattern on a metal plate.

There is a demand for a technology and a method that may improve security and reliability of apparatuses such as fingerprint security systems that use optical measurement and evaluation with respect to a living body (object).

SUMMARY

One or more exemplary embodiments provide technologies and methods, which may improve reliability of various measurements and evaluations with respect to an object, including optical measurements and evaluations.

Further, one or more exemplary embodiments provide technologies and methods of using information about a speckle pattern generated by coherent light in a measurement and evaluation with respect to an object.

Further still, one or more exemplary embodiments provide apparatuses and systems, which may reinforce security of a fingerprint security system.

Further still, one or more exemplary embodiments provide methods and algorithms, which may reinforce security of a fingerprint security system.

According to an aspect of an exemplary embodiment, there is provided an apparatus including: a light source configured to emit coherent light to an object; an imaging device configured to photograph a speckle pattern generated on the object by the coherent light; and a processor configured to determine whether the object is a living body or a non-living body based on a contrast value of the speckle pattern.

The processor may be configured to compare the contrast value of the speckle pattern with a threshold contrast value $K_{th}$ to determine whether the object is a living body or not.

The processor may be configured to determine that the object is a living body when the contrast value of the speckle pattern is less than the threshold contrast value $K_{th}$, and determine that the object is a non-living body when the contrast value of the speckle pattern is greater than the threshold contrast value $K_{th}$.

The threshold contrast value $K_{th}$ may be equal to or greater than about 0.2 and equal to or less than about 0.5.

The processor may be configured to compare the contrast value of the speckle pattern with a reference contrast value registered by a user, and determine that the object is a non-living body when the contrast value of the speckle pattern is two or more times greater than the reference contrast value.

The coherent light comprises laser and the speckle pattern may include a laser speckle pattern.

When the object comprises skin and blood vessels under skin, the apparatus may be configured to determine whether the object is a living body or not from a speckle pattern of a skin surface or a skin tissue of the object, without imaging blood vessels under the skin of the object.

The apparatus may be configured to determine whether a fingerprint of the object is a living body fingerprint or a non-living body fake fingerprint.

The apparatus may further include a fingerprint recognition module that recognizes a fingerprint of the object.

The fingerprint recognition module may be an optical fingerprint recognition module or a capacitive fingerprint recognition module.

The apparatus may be configured to recognize the fingerprint of the object by using the fingerprint recognition module and determine whether the fingerprint of the object is a living body fingerprint or a non-living body fake fingerprint by using the light source, the imaging device, and the processor.

The apparatus may further include at least one of a first optical system disposed between the light source and the object and a second optical system disposed between the object and the imaging device.

At least a part of the apparatus may constitute a mobile device.

The processor may be further configured to determine whether the object is a fake based on the determination of whether the object is a living body or a non-living body.

The processor may be further configured to determine that the object is a fake in response to the object is being determined as a non-living body.

According to an aspect of another exemplary embodiment, there is provided an apparatus for performing fingerprint authentication, The apparatus includes a processor configured to: acquire an image of an object while the object is in contact with a fingerprint scanner and coherent light beam is reflected off the object after being emitted to the object; detect a speckle pattern of the coherent light beam from the acquired image; determine a contrast value of the speckle pattern; and determine whether the object is a living body or a non-living body based on comparison between the contrast value of the speckle pattern and a predetermined value.

The processor may be further configured to determine that a fingerprint of the object is detected from a living body in response to the contrast value of the speckle pattern being less than the predetermined value.

The processor may be further configured to compare a fingerprint of the object, which is scanned while the coherent light beam is emitted to and reflected off the object, with a pre-stored fingerprint of the object, in response to the object being determined as a living body.

The processor may be further configured to control to indicate failure of fingerprint authentication in response to the object being determined as a non-living body.

The apparatus may further include a memory storing a computer program, and the processor may be further configured to execute the computer program to acquire the image of the object, detect the speckle pattern of the coherent light beam, determine the contrast value of the speckle pattern; and determine whether the object is a living body or a non-living body.

According to an aspect of another exemplary embodiment, there is provided a fingerprint authentication method including: recognizing a fingerprint of an object and determining whether the fingerprint is a fake, wherein the determining whether the fingerprint is a fake includes emitting coherent light to the object, photographing a speckle pattern generated on the object by the coherent light, and determining whether the fingerprint is a fake based on a contrast of the speckle pattern.

The determining of whether the fingerprint may be a fake comprises comparing the contrast value of the speckle pattern with a threshold contrast value $K_{th}$.

The fingerprint of the object may be determined to be a real fingerprint when the contrast value of the speckle pattern is less than the threshold contrast value $K_{th}$, and the fingerprint of the object may be determined to be a fake fingerprint when the contrast value of the speckle pattern is greater than the threshold contrast value $K_{th}$.

The threshold contrast value $K_{th}$ may be equal to or greater than about 0.2 and equal to or less than about 0.5.

The determining whether the fingerprint is a fake may include comparing the contrast value of the speckle pattern with a reference contrast value registered by a user, and the fingerprint of the object may be determined to be a fake when the contrast value of the speckle pattern is two or more times greater than the reference contrast value.

The recognizing the fingerprint of the object may include measuring similarity between the fingerprint of the object and a reference fingerprint.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and/or other aspects will be more apparent by describing certain exemplary embodiments, with reference to the accompanying drawings, in which:

FIGS. 15A and 15B are diagrams illustrating a fingerprint authentication process of a mobile device (smartphone) adopting a fingerprint authentication method according to an exemplary embodiment;

FIG. 17 shows photo images which illustrate an example of how a speckle pattern of an artificial fingerprint varies according to a photographing condition;

FIG. 21 shows photo images which illustrate an example of how a photographed speckle pattern varies according to a laser input current;

DETAILED DESCRIPTION

Figure 1:
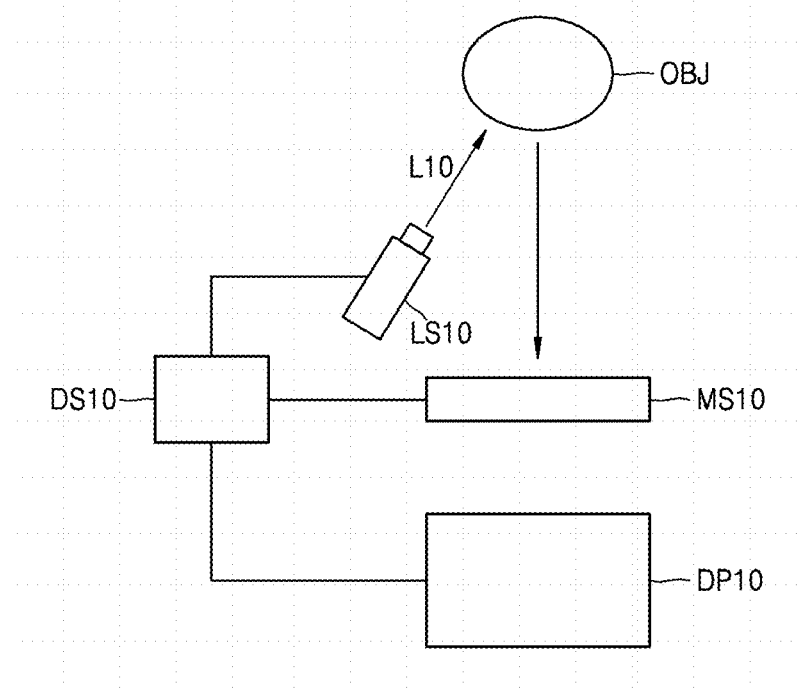
FIG. 1 is a schematic diagram of an apparatus (e.g., optical measurement apparatus with respect to an object) according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures) of embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments.

FIG. 1 is a schematic diagram of an apparatus (e.g., optical measurement apparatus with respect to an object) according to an exemplary embodiment.

Referring to FIG. 1, an apparatus according to the present embodiment may include a light source LS10 for emitting coherent light L10 to an object OBJ, and an imaging device unit MS10 for photographing a speckle pattern generated on the object OBJ by the coherent light L10. The coherent light L10 may be, for example, laser, i.e., a laser beam. The speckle pattern may be a pattern of tiny spots (speckles) generated when the coherent light L10 is scattered and reflected by the object OBJ so as to interfere with one another. The imaging device unit MS10 may include an image sensor. In a detailed example, the image sensor may be a charge-coupled device (CCD) or a complementary metal oxide semiconductor (CMOS) image sensor. In some cases, the image sensor may include an array of photodiodes or an array of phototransistors. The imaging device unit MS10 may be referred to as an image capturer, a photographing unit, and a camera.

The apparatus according to the present embodiment may include a computing unit DP10 having a function of determining whether the object OBJ is a living body or a non-living body by measuring a contrast of the speckle pattern. The computing unit DP10 may be referred to as a "data processor" or a "signal processor". The computing unit DP10 may be provided in a processor unit. The apparatus may further include a driving and signal converting unit DS10 between the imaging device unit MS10 and the computing unit DP10. The driving and signal converting unit DS10 may include a "light source driver" and a "signal converter". The light source driver may include a type of "power apparatus (power source)", and the signal converter may be a type of "data interface". A signal (data) converted by the signal converter may be processed by the computing unit DP10. In some cases, the driving and signal converting unit DS10 may be combined with the computing unit DP10 into one circuit portion (device portion). In other words, the circuit portion (device portion) may include the driving and signal converting unit DS10 and the computing unit DP10.

Whether the object OBJ is a living body or a non-living body may be determined based on a contrast value obtained by measuring (computing/calculating) the contrast of a speckle pattern image (that is, speckle image) photographed by the imaging device unit MS10. For example, when the measured contrast value is less than a particular value (threshold value), the object OBJ may be determined to be a living body. When the measured contrast value is greater than the particular value (threshold value), the object OBJ may be determined to be a non-living body. When the measured contrast value is equal to the particular value (threshold value), the object OBJ may be determined to be a living body or a non-living body according to a setting condition. Alternatively, whether the object OBJ is a living body or not may be determined by comparing the measured contrast with a reference contrast that a user previously registered.

Figure 23:
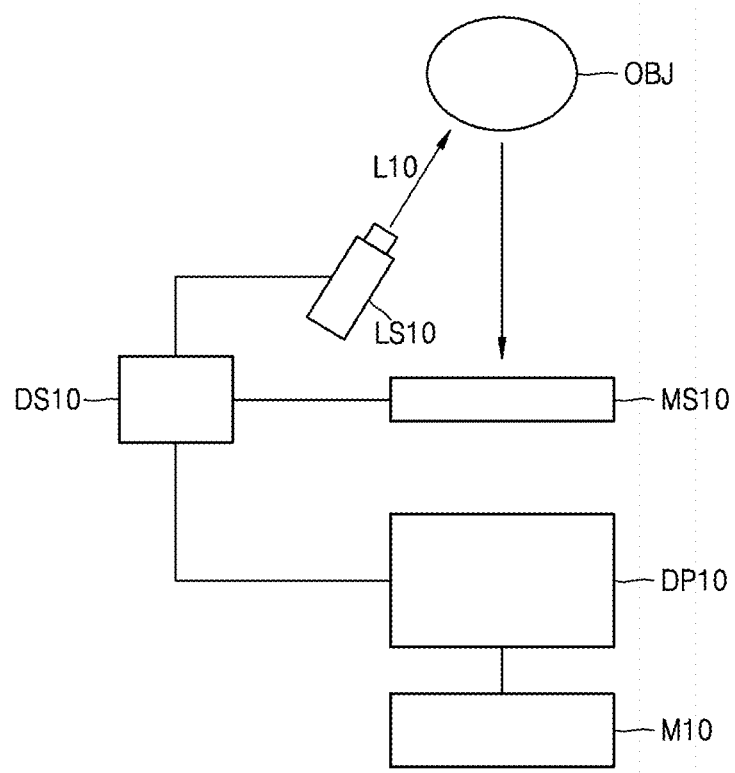
FIG. 23 is a schematic diagram of an optical measurement apparatus according to another exemplary embodiment.

As shown in FIG. 23, the apparatus may further include a memory M10 that stores one or more computer programs. The memory M10 may be connected to the computing unit DP10. The computing unit DP10 may execute the computer programs to acquire an image of the object OBJ while the object OBJ is in contact with a fingerprint scanner (e.g., a prism PS12 illustrated in FIG. 9) and coherent light beam is reflected off the object OBJ after being emitted to the object OBJ. Additionally, by using the computer programs, the computing unit DP10 may detect a speckle pattern of the coherent light beam from the acquired image, determine a contrast value of the speckle pattern, and determine whether the object OBJ is a living body or a non-living body based on comparison between the contrast value of the speckle pattern and a predetermined value. The apparatus may download the computer programs from a service provider server.

In the following description, a method of measuring (computing/calculating) a contrast of a speckle image is described in detail with reference to FIGS. 2 and 3.

Figure 2:
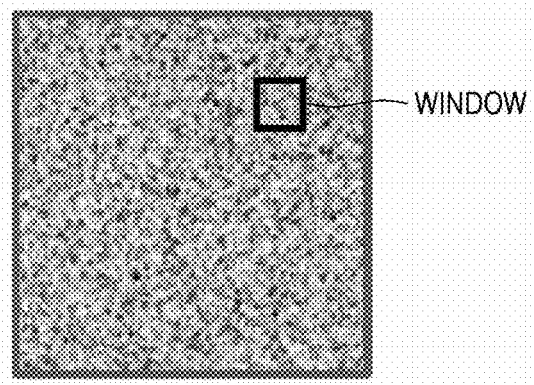
FIG. 2 is an example of a speckle image obtained by an imaging device unit of the apparatus of FIG. 1, for explaining a method of measuring a contrast from the speckle image.

FIG. 2 is an example of a speckle image obtained by the imaging device unit MS10 of FIG. 1, for explaining a method of measuring (computing/calculating) a contrast from the speckle image. A method of extracting a contrast in a spatial domain is described with reference to FIG. 2.

Referring to FIG. 2, a speckle image photographed once is illustrated. The speckle image may be divided into a plurality of small windows and a contrast of each window may be extracted. When a coordinate of the center of a window is (x,y), a contrast of the window may be represented as K(x,y). After one of the windows is divided into a plurality of unit areas, that is, N-number of unit areas, the intensity of brightness, that is, light intensity, of each of the unit areas may be obtained. A value obtained by dividing the standard deviation ($\sigma_N$) of the brightness (light intensity) of the unit areas by an average value ($\mu_N$) may be defined as a contrast value of the coordinate (x,y). In other words, K(x,y) may be defined as follows.

$$K(x, y) = \frac{\sigma_N}{\mu_N} \quad \text{[Equation 1]}$$

The contrast value may be obtained for all coordinates (windows) in the entire area of the speckle image. By calculating an average of the contrast values or performing some other calculations with the contrast values, the contrast of the speckle image may be obtained (set). The method of extracting a contrast from the one-time photographed speckle image illustrated in FIG. 2 may be referred to as a contrast extraction method in a spatial domain.

Figure 3:
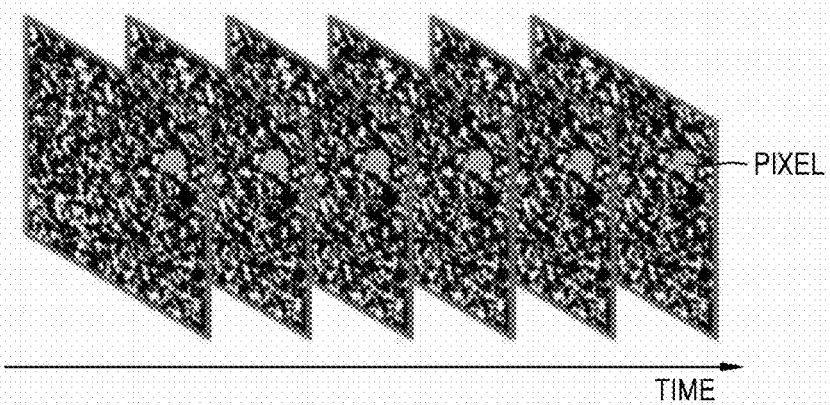
FIG. 3 is an example of speckle images obtained by an imaging device unit of the apparatus of FIG. 1, for explaining a method of measuring a contrast from the speckle images.

FIG. 3 shows an example of speckle images obtained by the imaging device unit MS10 of FIG. 1, for explaining a method of measuring (computing/calculating) a contrast from the speckle images. A method of extracting a contrast in a temporal domain is described with reference to FIG. 3.

Referring to FIG. 3, a plurality of speckle images, that is, N-number of speckle images, are continuously photographed with respect to the same object according to time. A contrast value, that is, $\sigma_N/\mu_N$, may be obtained with respect to an area (referred to as a "pixel area") corresponding to the same position, that is, a coordinate (x,y), on the speckle images. "$\sigma_N$" denotes the standard deviation of brightness (light intensity) of pixel areas at the same position on the speckle images, and "$\mu_N$" denotes an average value of brightness (light intensity) of the pixel areas. The value "$\sigma_N/\mu_N$" may be defined to be the contrast of the coordinate (x,y). Contrast values for all coordinates (pixel areas) of the entire speckle image may be obtained by the above method. Accordingly, the contrast of the speckle images may be obtained (set) by calculating an average of the contrast values or appropriately performing some other calculations with the contrast values. As such, the method of extracting a contrast from a plurality of speckle images continuously photographed according to time may be referred to as a contrast extraction method in a temporal domain.

In some cases, the contrast of a speckle image may be extracted by combining the spatial domain method of FIG. 2 and the temporal domain method of FIG. 3. For example, the spatial domain method of FIG. 2 may be applied to the speckle images of FIG. 3. Furthermore, a contrast image may be obtained by using the methods of FIGS. 2 and 3 or a combined method thereof. In other words, if necessary, "laser speckle contrast imaging" may be performed.

In the present embodiment, the spatial domain method of FIG. 2, the temporal domain method of FIG. 3, and the combined method thereof may all be used. When the spatial domain method of FIG. 2 is used, since a contrast of a speckle pattern may be extracted by one-time photography, the contrast may be calculated at a relatively fast speed.

The contrast of a speckle image obtained from a living body and the contrast of a speckle image obtained from a non-living body may have a clear difference. Essentially, the living body may be filled with body fluids. In addition to blood, there are various liquid and fluid materials such as tissue fluid or lymph in the body. In contrast, body fluids (liquid and fluid) substantially do not exist in a non-living body such as plastic or metal. A speckle pattern is generated on an object by coherent light (e.g., laser light). When the object is a living body including liquid and fluid, a spot of a speckle pattern blurs due to the liquid and fluid and thus the contrast of the speckle pattern may be low. On the other hand, when the object is a non-living body that is mostly composed of a solid, the spot of a speckle pattern appears to be small and clear (vivid), and thus the contrast of the speckle pattern may be high. Accordingly, the contrast of a speckle image obtained from a living body and the contrast of a speckle image obtained from a non-living body have a clear difference. Whether the object is a living body or a non-living body may be easily determined by using the above difference. In a detailed example, it may be determined whether a fingerprint of the object is a living body fingerprint (real fingerprint) or a non-living body fingerprint (fake fingerprint).

Figure 4:
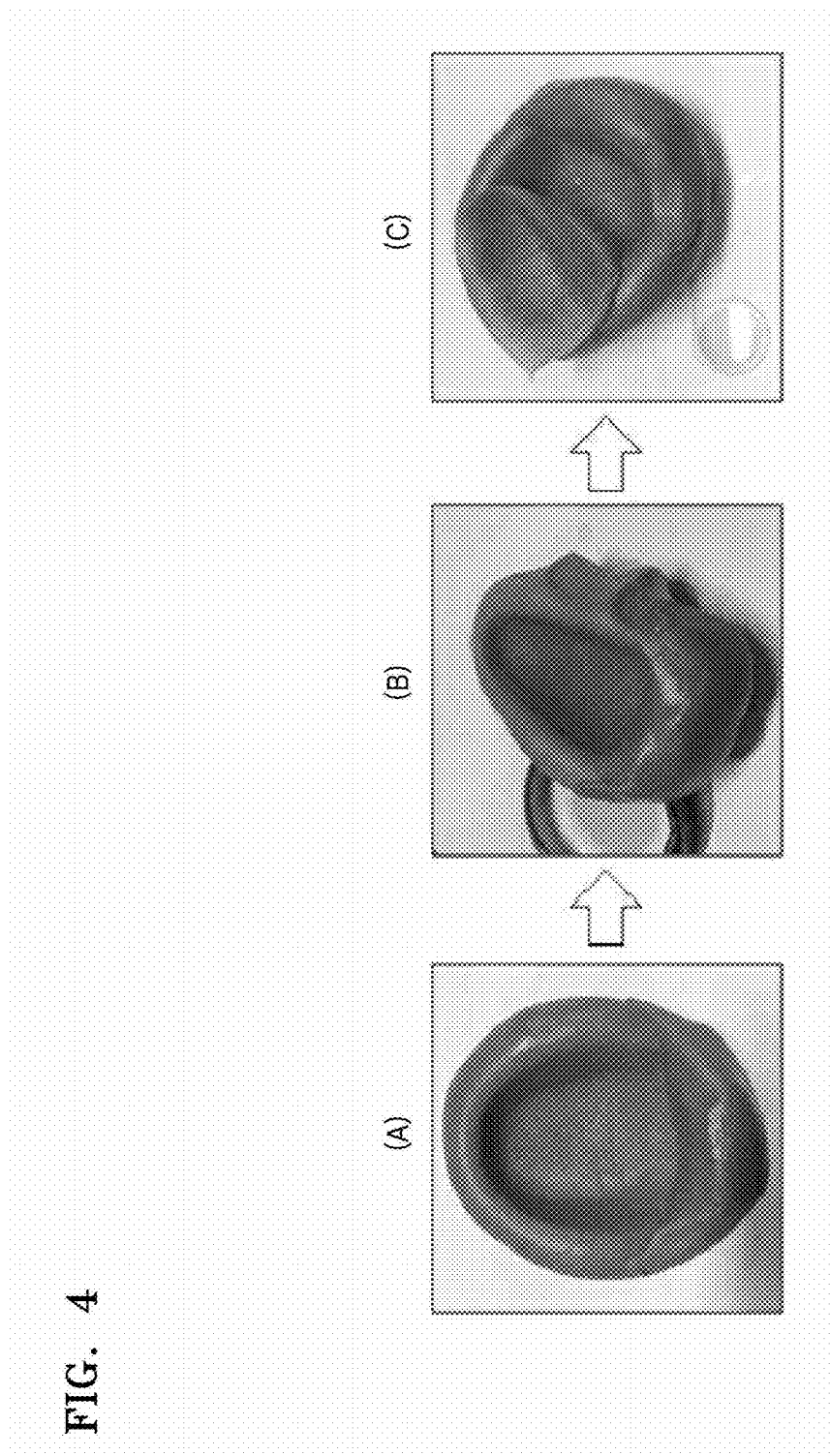
FIG. 4 is a series of photo images showing a process of making a fake fingerprint by imitating a living body fingerprint.

FIG. 4 shows photo images which illustrate a process of making a fake fingerprint by imitating a living body fingerprint.

Picture (A) of FIG. 4 shows that a mold, that is, a cast, may be made by using a living body fingerprint in operation A. Picture (B) of FIG. 4 shows operation B in which resin may be poured into the cast (mold). The resin may include a main material and a curing agent (hardener). Picture (C) of FIG. 4 shows that after a certain time has passed, the hardened resin may be separated from the cast (mold) in operation C. As such, a plastic fake fingerprint may be easily produced. In addition, a living body fingerprint may be imitated on a metal plate by using an etching process on metal.

Figure 5:
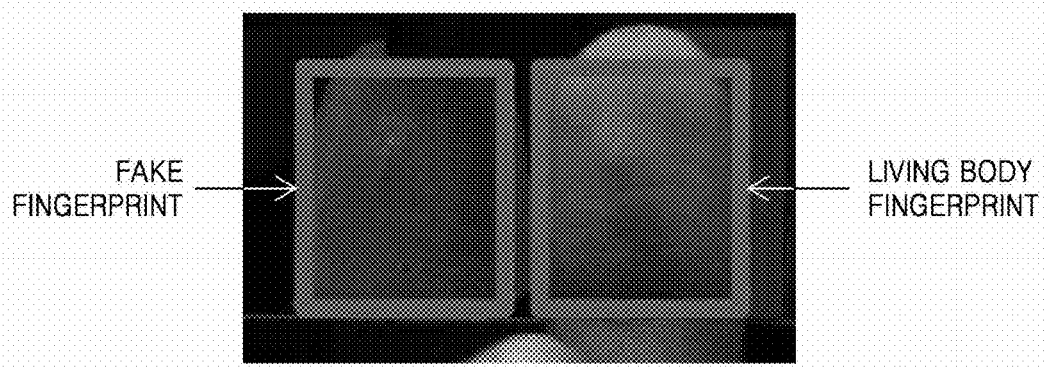
FIG. 5 is a photo image showing a living body fingerprint and a fake fingerprint.

FIG. 5 is a photo image showing a living body fingerprint and a fake fingerprint. In FIG. 5, a left side image is a fake fingerprint and a right side image is a living body fingerprint. The fake fingerprint is made by the method of FIG. 4.

Figure 6:
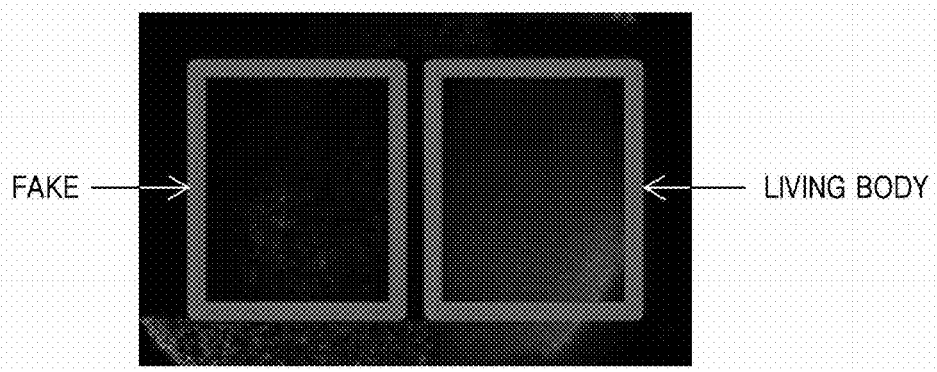
FIG. 6 is a photo image showing a living body fingerprint and a fake fingerprint, which are exposed to laser light.

FIG. 6 is a photo image showing a living body fingerprint and a fake fingerprint, which are exposed to laser light. In FIG. 6, a left-side image is an exposure image of the fake fingerprint of FIG. 5 and a right-side image is an exposure image of the living body fingerprint of FIG. 5.

Figure 7:
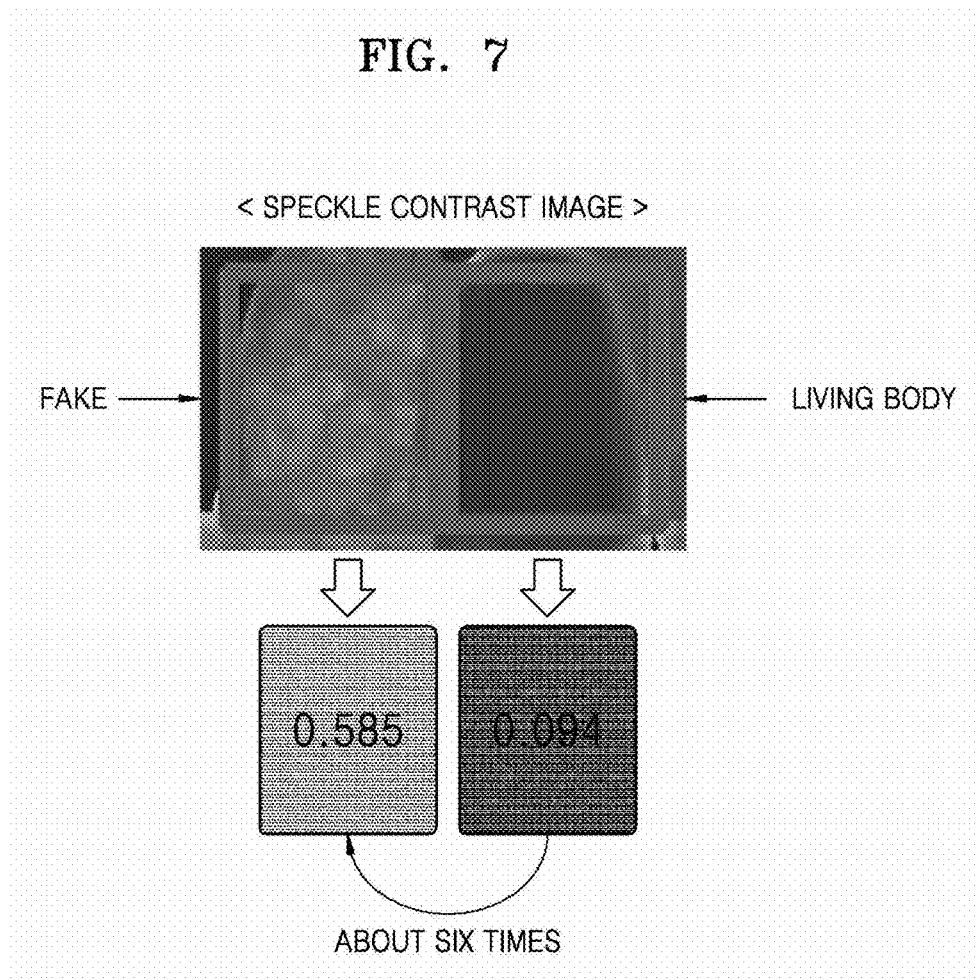
FIG. 7 is a speckle contrast image obtained from the images of FIG. 6.

FIG. 7 includes a speckle contrast image obtained from the exposure images of FIG. 6. In FIG. 7, a left-side image is a speckle contrast image of the fake fingerprint and a right-side image is a speckle contrast image of the living body fingerprint.

An average contrast is calculated from each of the two speckle contrast images of FIG. 7. In this state, the contrast extraction method in a spatial domain is used and a window size is 10×10. The window size (that is, 10×10) is determined based on the number of pixels of the image sensor. In other words, a window size corresponding to 10 pixels×10 pixels is set to one window. The same measurement method is used for the speckle image photographed in the same conditions. As a result, a contrast value of the fake fingerprint on the left side is 0.585, that is, relatively high, and a contrast value of the living body fingerprint on the right side is 0.094, that is, relatively very low. In other words, the contrast value (0.585) of the fake fingerprint is six or more times greater than the contrast value (0.094) of the living body fingerprint.

A threshold contrast value $K_{th}$ that is a standard for distinguishing a living body fingerprint and a non-living body fingerprint may be set from the above result. For example, the threshold contrast value $K_{th}$ may be set within a range of about 0.2 to about 0.5. In other words, the threshold contrast value $K_{th}$ may be equal to or greater than about 0.2 and equal to or less than about 0.5. In this case, when the measured contrast is less than the threshold contrast value $K_{th}$, the object may be determined to be a living body. When measured contrast is greater than the threshold contrast value $K_{th}$, the object may be determined to be a non-living body.

In another case, a reference contrast previously registered by a user may be used. In this case, when a measured contrast is two or more times or three or more times greater than the reference contrast value, the object may be determined to be a non-living body. Since, as in the result of FIG. 7, the contrast of a fake fingerprint and the contrast of a living body fingerprint have a big difference, for example, of six or more times, whether a fingerprint is of a living body or not may be sufficiently determined with a reference of two or more times or three or more times.

In addition, as may be seen from the right-side image of FIG. 6 and the right-side image of FIG. 7, in the present embodiment, whether an object is a living body or not may be determined from a speckle pattern of a skin surface or skin tissue of the object, without imaging blood vessels under skin of the object. In other words, in the present embodiment, without imaging a blood vessel or using a change of a speckle image according to a heartbeat, whether the object is a living body or not (fake or not) may be determined. The laser light used in the present embodiment may be a laser beam of an infrared (IR) range such as a near infrared ray (NIR) or a laser beam of a blue range (about 430 to about 470 nm wavelength range) that has relatively low skin permeation. In some cases, a laser beam of a red range may be used. However, the wavelength range of a laser beam that may be used in the present embodiment is not particularly limited and laser beams of various wavelength ranges may be used.

Figure 8:
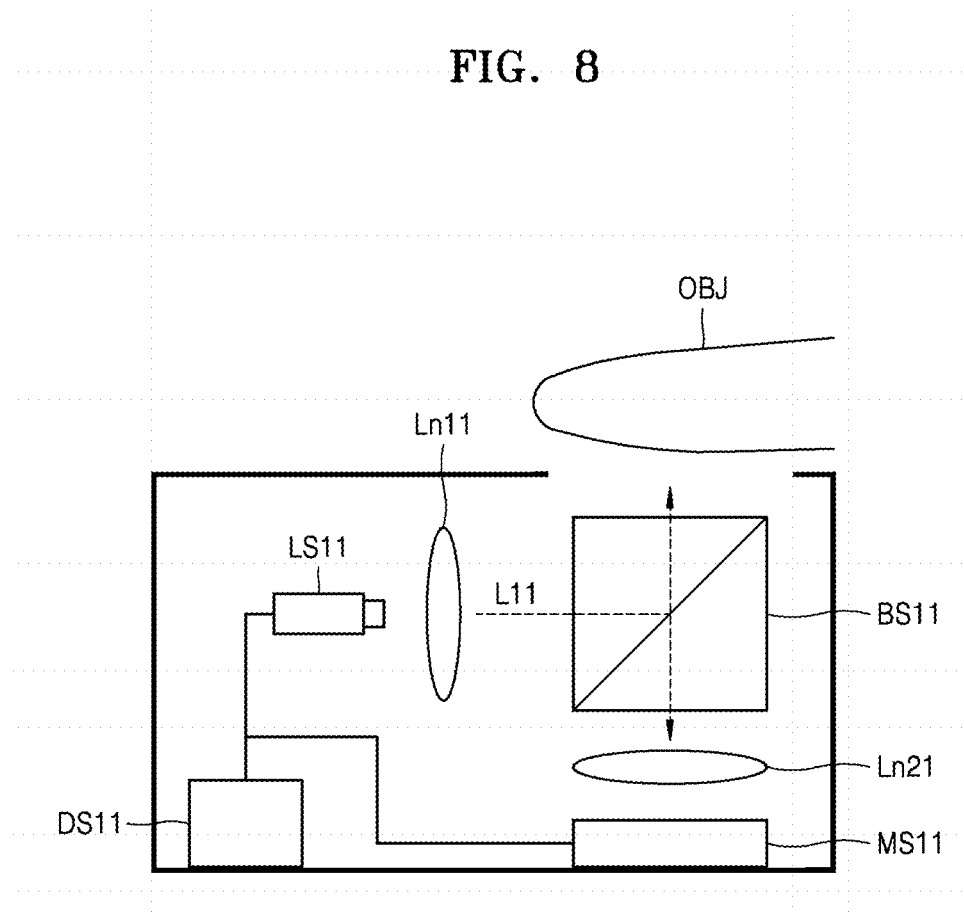
FIG. 8 is a diagram illustrating an apparatus (e.g., optical measurement apparatus) according to another exemplary embodiment.

FIG. 8 is a diagram illustrating an apparatus (e.g., optical measurement apparatus) according to another exemplary embodiment.

Referring to FIG. 8, the apparatus according to the present embodiment may include a light source LS11 for emitting coherent light L11 (e.g., laser light) to the object OBJ and an imaging device unit MS11 for photographing a speckle pattern generated on the object OBJ by the coherent light L11. A light path change member may be provided between the light source LS11 and the object OBJ. The light path change member may be, for example, a beam splitter BS11. The beam splitter BS11 may be arranged between the object OBJ and the imaging device unit MS11. The beam splitter BS11 may be replaced with another optical member having a similar function, for example, a transflective film.

The apparatus of the present embodiment may further include a driving and signal converting unit DS11 connected to the light source LS11 and the imaging device unit MS11. The apparatus may further include a computing unit that measures a contrast of a speckle pattern and determines whether the object OBJ is a living body or a non-living body based on the measured contrast. The computing unit, which corresponds to the computing unit DP10 of FIG. 1, may be connected to the driving and signal converting unit DS11. The computing unit DP10 and the driving and signal converting unit DS11 may be implemented with one or more processors.

The apparatus according to the present embodiment may further include a certain optical system disposed between the light source LS11 and the beam splitter BS11 and/or between the imaging device unit MS11 and the beam splitter BS11. In other words, the apparatus may further include at least one of a first optical system disposed between the light source LS11 and the beam splitter BS11 and a second optical system disposed between the imaging device unit MS11 and the beam splitter BS11. In the present embodiment, a first lens system Ln11 is provided between the light source LS11 and the beam splitter BS11, and a second lens system Ln21 is provided between the imaging device unit MS11 and the beam splitter BS11. Although the first and second lens systems Ln11 and Ln21 are briefly illustrated for convenience of explanation, this is merely provided as an example and structures thereof may be variously changed. Furthermore, at least one of the first and second optical systems Ln11 and Ln21 may not be provided.

The structure of FIG. 8 may be an example of a modularized optical measurement apparatus. In this case, the object OBJ may be photographed from a relatively far distance in a non-contact manner. Even when the first and second lens systems Ln11 and Ln21 are not used, various purposes of the present embodiment may be achieved without difficulty. However, when the first and second lens systems Ln11 and Ln21 are used, photographing conditions may be more easily controlled.

The apparatuses described with reference to FIGS. 1 and 8, that is, the apparatuses using optical measurement and evaluation with respect to an object may be applied to fingerprint recognition apparatuses (fingerprint security systems). In this case, the fingerprint recognition apparatus (fingerprint security system) may use an optical fingerprint recognition module or a capacitive fingerprint recognition module. Accordingly, an optical apparatus according to an embodiment may include the apparatus of FIG. 1 or 8, and a fingerprint recognition module (e.g., optical or capacitive type). The fingerprint recognition module may also be referred to as a fingerprint scanner or a fingerprint reader. Examples thereof are described in detail with reference to FIGS. 9 and 10.

Figure 9:
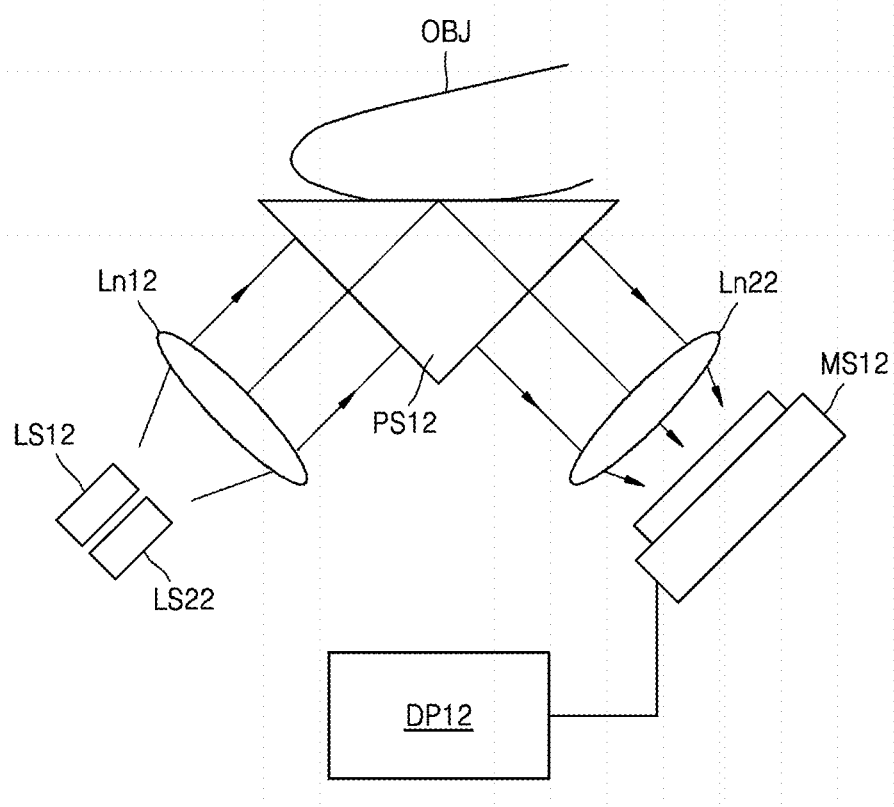
FIG. 9 is a diagram of a case in which an optical measurement apparatus with respect to an object is applied to a fingerprint recognition system, according to an exemplary embodiment.

FIG. 9 is a diagram of a case in which an optical measurement apparatus with respect to an object is applied to a fingerprint recognition system, according to an exemplary embodiment.

Referring to FIG. 9, a first light source LS12 for emitting coherent light (e.g., laser light) to the object OBJ may be provided. The first light source L512 may be a light source for fake detection. Furthermore, a second light source LS22 for emitting light for fingerprint recognition to the object OBJ may be further provided. Light generated by the second light source LS22 may be incoherent light. For example, the first light source L512 may include a laser diode (LD) and the second light source LS22 may include a light-emitting diode (LED). A certain optical member, for example, a prism PS12, may be provided between the first and second light sources LS12 and LS22 and the object OBJ.

At least one imaging device unit MS12 may be provided to photograph a speckle pattern generated on the object OBJ by the coherent light generated by the first light source L512, and to also photograph a fingerprint image of the object OBJ by using the incoherent light generated by the second light source LS22. Although a case of using one imaging device unit MS12 is illustrated in the present embodiment, two imaging device units may be used. In other words, although only one imaging device unit MS12 may be used for fake detection and fingerprint recognition, a first imaging device unit for fake detection and a second imaging device unit for fingerprint recognition may be separately used.

A first lens system Ln12 may be provided between the first and second light sources LS12 and LS22 and the prism PS12, and a second lens system Ln22 may be provided between the prism PS12 and the imaging device unit MS12. Although the first lens system Ln12 is illustrated as being used for both of the first and second light sources LS12 and LS22, a separate lens system may be used for each of the first and second light sources LS12 and LS22. In other words, a primary-first (1-1) lens system for the first light source LS12 and a primary-second (1-2) lens system for the second light source LS22 may be used. Furthermore, the positions of the first and second light sources LS12 and LS22 are examples and may be changed.

A computing unit DP12 connected to the imaging device unit MS12 may be further provided. The computing unit DP12 may have a function of recognizing a fingerprint of the object OBJ and may also have a function of determining whether the object OBJ is a living body or not by measuring a contrast of a speckle pattern on the object OBJ. A device portion (circuit portion) that is equivalent or similar to the driving and signal converting unit DS10 of FIG. 1 may be further provided.

Figure 10:
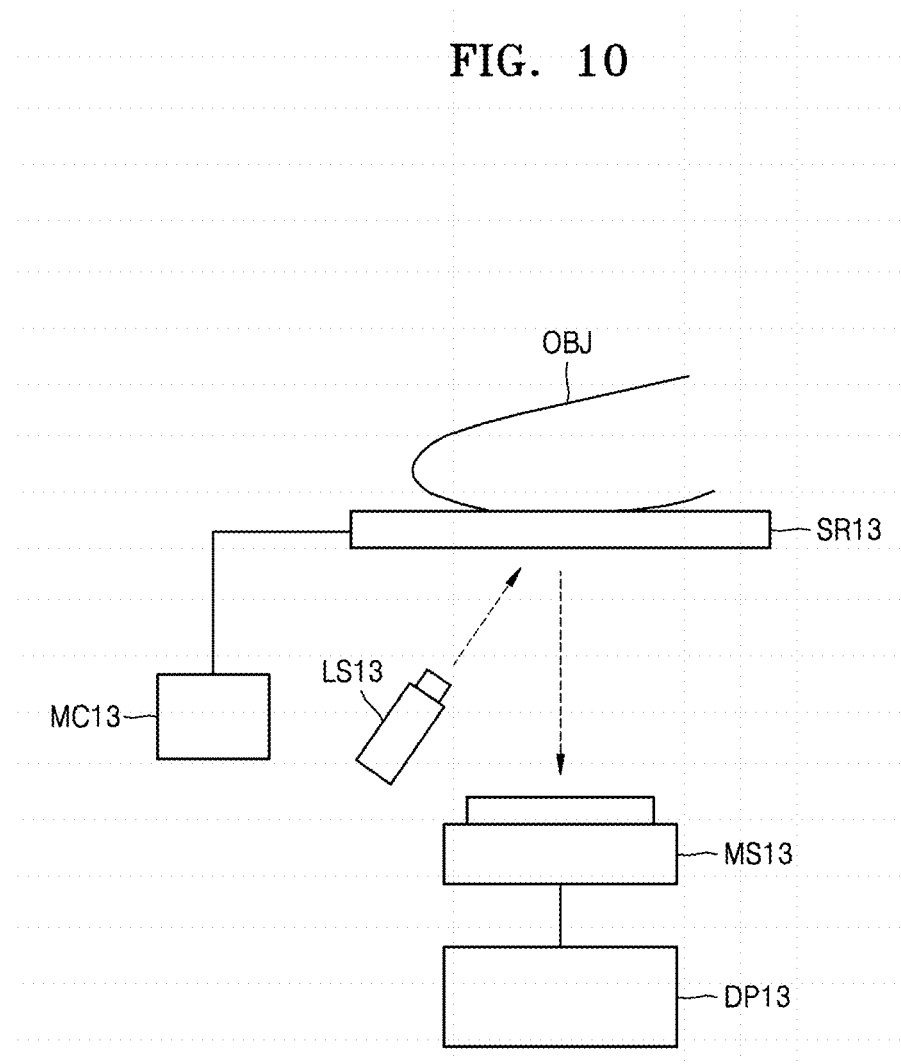
FIG. 10 is a diagram of a case in which an optical measurement apparatus with respect to an object is applied to a fingerprint recognition system, according to another exemplary embodiment.

FIG. 10 is a diagram of a case in which an optical measurement apparatus with respect to an object is applied to a fingerprint recognition system, according to another exemplary embodiment.

Referring to FIG. 10, a capacitive fingerprint sensor SR13 may be provided and the object OBJ may contact the capacitive fingerprint sensor SR13. The capacitive fingerprint sensor SR13 may measure capacitance of the capacitive fingerprint sensor SR13 which may be changed when the object OBJ comes into contact with the capacitive fingerprint sensor SR13. A measurement circuit portion MC13 may be connected to the capacitive fingerprint sensor SR13. The capacitive fingerprint sensor SR13 and the measurement circuit portion MC13 may together form a fingerprint recognition module used for a general capacitive fingerprint recognition apparatus.

A light source LS13 for emitting coherent light to the object OBJ may be provided. An imaging device unit MS13 for photographing a speckle pattern generated on the object OBJ by the coherent light may also be provided. Furthermore, there may be further provided a computing unit DP13 connected to the imaging device unit MS13 and having a function of determining whether the object OBJ is a living body or a non-living body by measuring and calculating a contrast of the speckle pattern. An optical system (e.g., lens system) may be further provided between the light source LS13 and the object OBJ and/or between the object OBJ and the imaging device unit MS13. Furthermore, the driving and signal converting unit DS10 as described in FIG. 1 may be further provided.

In the optical measurement apparatus of FIG. 10, the capacitive fingerprint sensor SR13 may be transparent with respect to the coherent light generated by the light source LS13. If the capacitive fingerprint sensor SR13 is not transparent with respect to the coherent light, a transparent window may be formed in an area of the capacitive fingerprint sensor SR13 so that the coherent light may be emitted to the object OBJ through the transparent window. The optical measurement apparatus of FIG. 10 may be changed in various ways.

The apparatuses of FIGS. 9 and 10 may include a fingerprint recognition device portion for recognizing a fingerprint of the object OBJ and a fake detection device portion for detecting whether the fingerprint of the object OBJ is a fake or not. In FIG. 9, the fingerprint recognition device portion may include an optical fingerprint recognition module, whereas in FIG. 10 the fingerprint recognition device portion may include a capacitive fingerprint recognition module. In FIGS. 9 and. 10, the fake detection device portion may have the same structure and features as those described with reference to FIGS. 1 and 8.

Figure 11:
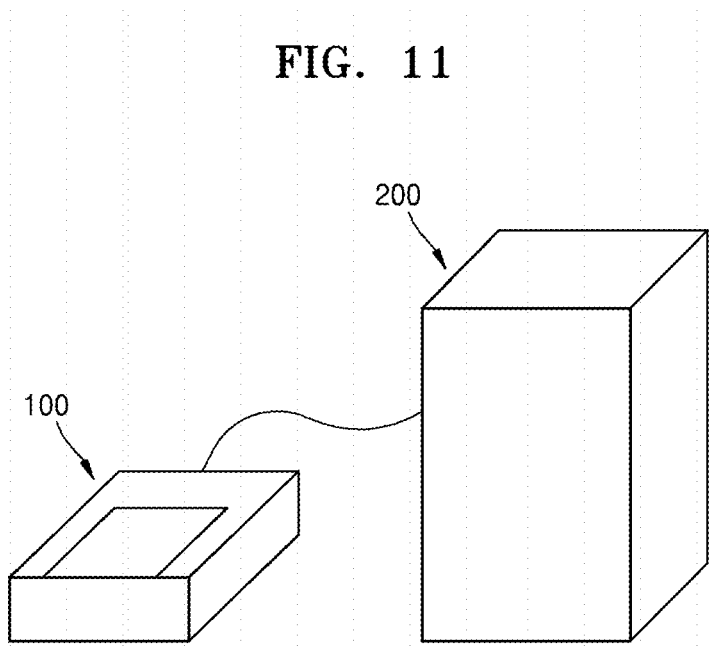
FIG. 11 is a perspective view of an apparatus (system) for fingerprint recognition and fake detection, according to another exemplary embodiment.

FIG. 11 is a perspective view of an apparatus or system for fingerprint recognition and fake detection, according to another exemplary embodiment.

Referring to FIG. 11, a photographing and measurement apparatus 100 may be provided and a computing apparatus 200 connected to the photographing and measurement apparatus 100 may be provided. The photographing and measurement apparatus 100 may include a fingerprint recognition module for recognizing a fingerprint of an object and may also include a speckle pattern photographing apparatus for determining whether the object is a fake. The fingerprint recognition module may be an optical or capacitive fingerprint recognition module. The speckle pattern photographing apparatus may include a light source for generating coherent light and an imaging device unit for photographing a speckle pattern.

The computing apparatus 200 may include a computing unit having a function of determining whether the object is a fake by measuring and calculating a contrast of the speckle pattern. The computing unit may be the same as or similar to the computing unit DP10 described with reference to FIG. 1. Furthermore, the computing apparatus 200 may further include a data processor for fingerprint recognition to be used in a general fingerprint recognition system. The computing apparatus 200 may be configured to finally authenticate the fingerprint of the object, considering both of similarities of the fingerprint and whether the fingerprint is a fake.

As illustrated in FIG. 11, the photographing and measurement apparatus 100 and the computing apparatus 200 may separately exist. In other words, not only the photographing and measurement unit and the computation device unit may be included in one apparatus, but the externally located computing apparatus 200 may also be used. Although the photographing and measurement apparatus 100 and the computing apparatus 200 are connected in a wired manner, the photographing and measurement apparatus 100 and the computing apparatus 200 may be connected wirelessly.

Figure 12:
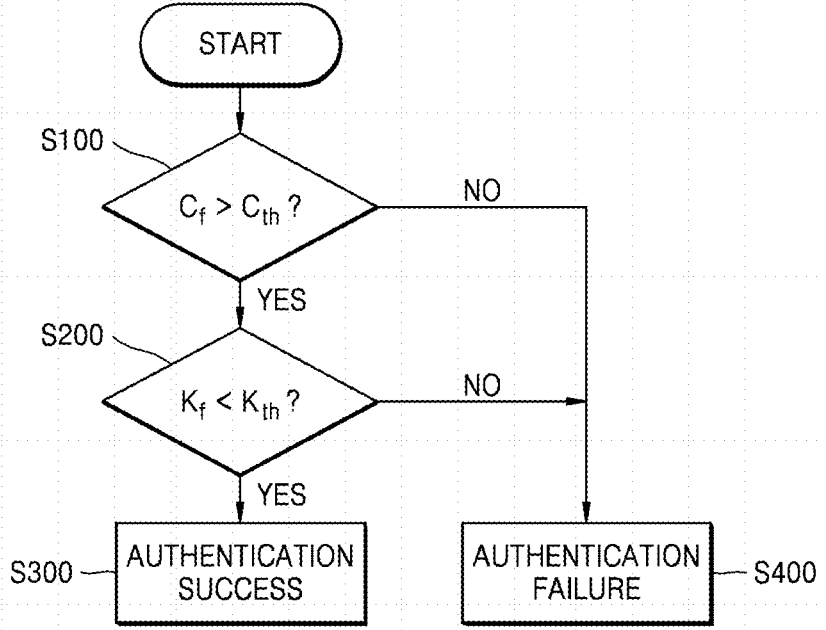
FIG. 12 is a flowchart of an algorithm applicable to a fingerprint authentication method, according to an exemplary embodiment.

FIG. 12 is a flowchart of an algorithm applicable to a fingerprint authentication method, according to an exemplary embodiment.

Referring to FIG. 12, in operation S100, image similarity between an acquired (measured) fingerprint pattern and a recorded (registered/reference) fingerprint pattern may be determined. "$C_f$" denotes the image similarity. When the image similarity $C_f$ is greater than a preset threshold similarity (reference similarity) $C_{th}$, operation S200 may be performed. In operation S200, whether the object is a living body or a non-living body is determined, thereby determining whether the object is a fake. A contrast value $K_f$ of a speckle pattern of the object measured in the operation S200 may be compared with a threshold contrast value $K_{th}$. When the measured contrast value $K_f$ is less than the threshold contrast value $K_{th}$, a fingerprint of the object may be determined to be a living body fingerprint, that is, a real fingerprint. In this case, authentication of a fingerprint may be successful (operation S300).

When the image similarity $C_f$ is not greater than a preset threshold similarity $C_{th}$ in operation S100 or the contrast value $K_f$ measured in operation S200 is not less than the threshold contrast value $K_{th}$, the authentication of a fingerprint may be determined as having failed (operation S400).

In the present embodiment, the threshold contrast value $K_{th}$ may be set in a range of, for example, about 0.2 to about 0.5. In other words, the threshold contrast value $K_{th}$ may be equal to or greater than 0.2 and equal to or less than 0.5. For example, for a living body fingerprint, the contrast value of a speckle pattern may be less than about 0.2, and for a non-living body fingerprint, the contrast value of a speckle pattern may be greater than about 0.5. Accordingly, the threshold contrast value $K_{th}$ may be determined within the above range. However, the threshold contrast value $K_{th}$ is not limited to the above range and may be changed in some cases.

In another exemplary embodiment, a reference contrast previously registered by a user may be used in operation S200. In this case, when the measured contrast value $K_f$ is two or more times or three or more times greater than the reference contrast value, the object may be determined to be a non-living body.

Furthermore, in the algorithm of FIG. 12, the order of operation S100 and operation S200 may be reversed. In other words, similarity of a fingerprint may be determined after the determination of whether or not the fingerprint is a living body (whether the fingerprint is a fake).

Figure 13:
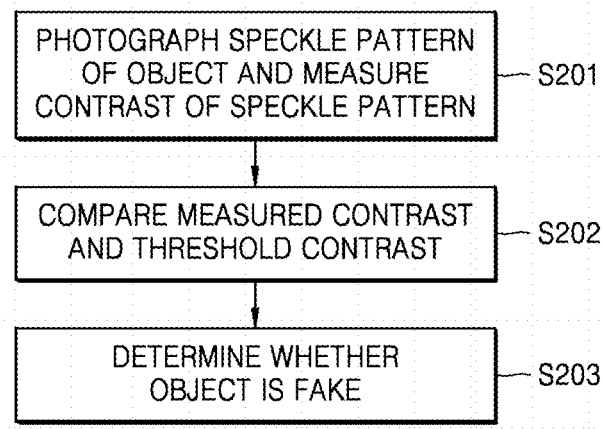
FIG. 13 is a flowchart of a method of determining whether a fingerprint is a fake in a fingerprint authentication method, according to an exemplary embodiment.

FIG. 13 is a flowchart of a method of determining whether a fingerprint is a fake in a fingerprint authentication method, according to an exemplary embodiment. Operations S201-S203 according to the present exemplary embodiment may be included in operation S200 of FIG. 12.

Referring to FIG. 13, in operation S201, a speckle pattern of an object may be photographed and a contrast of the speckle pattern is measured. In operation S202, the contrast value $K_f$ measured in operation S201 and the threshold contrast value $K_{th}$ may be compared with each other. Whether the object is a fake may be determined in operation S203 based on a result of operation S202. For example, the threshold contrast value $K_{th}$ may be determined to be in a range of, for example, about 0.2 to about 0.5. When the measured contrast value $K_f$ is greater than the threshold contrast value $K_{th}$ in operation S202, the object, that is, a fingerprint of the object, may be determined to be a fake in operation S203.

Figure 14:
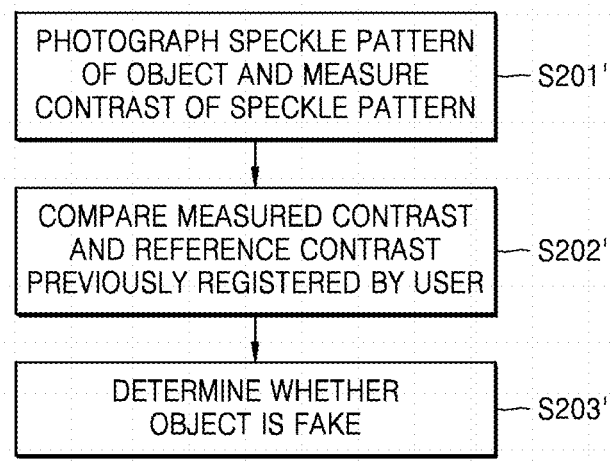
FIG. 14 is a flowchart of a method of determining whether a fingerprint is a fake in a fingerprint authentication method, according to another exemplary embodiment.

FIG. 14 is a flowchart of a method of determining whether a fingerprint is a fake in a fingerprint authentication method, according to another exemplary embodiment.

Referring to FIG. 14, in operation S201', a speckle pattern of an object may be photographed and a contrast of a speckle pattern may be measured. In operation S202', the contrast value $K_f$ measured in operation S201' may be compared with a reference contrast value $K_{ref}$ previously registered by a user. Whether the object is a fake may be determined in operation S203', based on a result of operation S202'. For example, when the measured contrast value $K_f$ is two or more times or three or more times greater than the reference contrast value $K_{ref}$ in operation S202', whether the object, that is, a fingerprint of the object, may be determined to be a fake in operation S203'.

The optical measurement apparatus and the fingerprint recognition system (apparatus) including the same, and the algorithms relative thereto, according to the above-described embodiments, may be applied to various devices, for example, mobile devices such as smartphones or compact electronic devices.

FIGS. 15A and 15B are diagrams illustrating a fingerprint authentication process of a mobile device (smartphone) adopting a fingerprint authentication method according to an exemplary embodiment.

FIG. 15A illustrates a case in which a living body fingerprint is recognized and authentication succeeds, and FIG. 15B illustrates a case in which fingerprint authentication fails by using a fake fingerprint. As such, according to the present technology and method, security and reliability of fingerprint authentication may be reinforced.

Figure 16A:
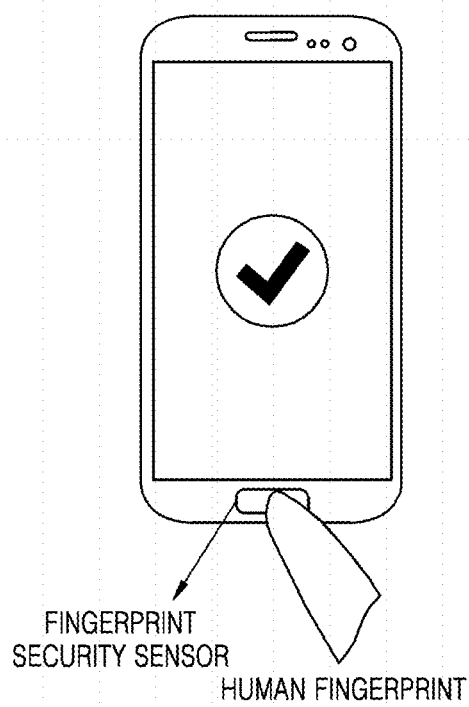
FIGS. 16A and 16B are diagrams illustrating a fingerprint authentication process of a mobile device (smartphone) adopting a fingerprint authentication method according to a comparative example.
Figure 16B:
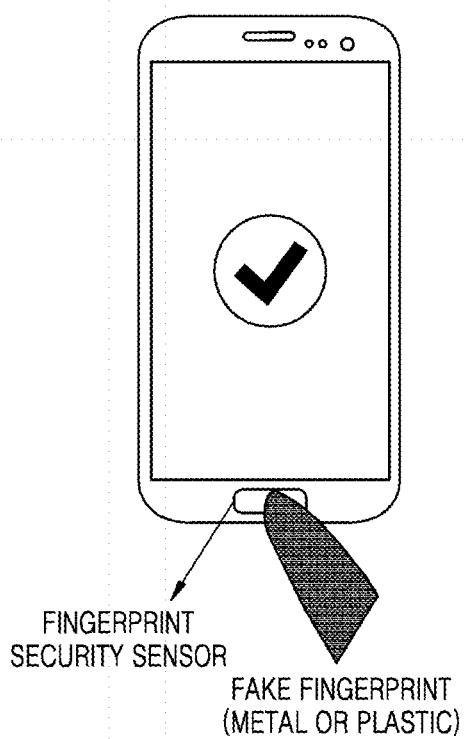

FIGS. 16A and 16B are diagrams illustrating a fingerprint authentication process of a mobile device (smartphone) adopting a fingerprint authentication method according to a comparative example.

FIG. 16A illustrates a case in which a living body fingerprint is recognized and authentication succeeds, and FIG. 16B illustrates a case in which fingerprint authentication succeeds by using a fake fingerprint. In other words, in a case of a fingerprint recognition system (existing fingerprint recognition system) according to the comparative example, security may be disabled with only fingerprint pattern information.

In the determination of whether the object is a living body or not (i.e., whether the object is a fake or not) by using the optical measurement apparatus of FIGS. 1 and 8, the size of a speckle that is photographed may be controlled by adjusting an aperture, a magnification ratio, and a focal length of a lens of the optical system used at the photographing part (imaging device part). When the size of one speckle to be photographed is $\rho_{speckle}$, the wavelength of light (laser) used for photographing is $\lambda$, the magnification ratio of the optical system used for photographing is $M_{cam}$, the focal length is f, and the F-number of the optical system is f/#, the "$\rho_{speckle}$" may be expressed (defined) by Equation 2.

$$\rho_{speckle} = 2.44\lambda(1+M_{cam})f/\# \qquad \text{[Equation 2]}$$

The F-number may denote the ratio of the focal length f to the diameter of the aperture. Accordingly, as the wavelength $\lambda$ increases, the F-number f/# increases, and the magnification ratio $M_{cam}$ increases, the size of a speckle $\rho_{speckle}$ may increase. In Equation 2, 2.44 may be a constant determined from a function representing a speckle.

The size of a speckle $\rho_{speckle}$ photographed in the present embodiment may be controlled to be about two or more times greater than a pixel size of an image sensor included in the photographing part (imaging device part). When the size of a speckle $\rho_{speckle}$ is about two or more times greater than the pixel size of the image sensor, photographing of a speckle pattern and contrast extraction may be more easily performed.

Since the measured contrast value may vary according to a condition of the photographing part (imaging device part) that photographs the speckle pattern, that is, a photographing condition, if necessary, an appropriate photographing condition may be chosen.

FIG. 17 shows photo images showing an example of how a speckle pattern of an artificial fingerprint varies according to a photographing condition. The left-side photo image is taken with an F-number of about f/16, whereas the right-side photo image is taken with an F-number of about f/1.8. As an F-number decreases, the size of a speckle may decrease and a speckle contrast value may decrease. The left side and right side photo images are taken on the same light quantity condition.

Figure 18:
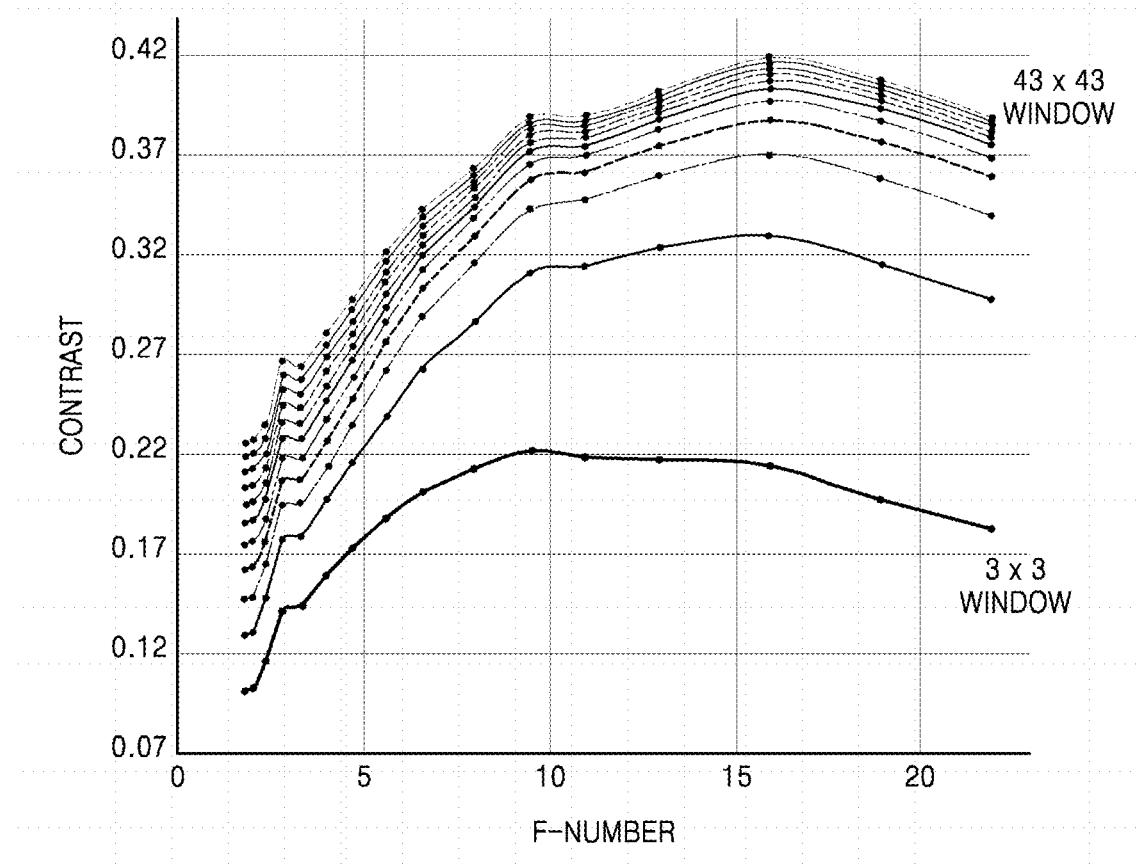
FIG. 18 is a graph showing a result of measurement of a change in a speckle contrast value of an object while changing an F-number of an optical system used in a photographing part.

FIG. 18 is a graph showing a result of measurement of a change in a speckle contrast value of an object while changing an F-number of an optical system used in a photographing part. The measurement is performed by using the contrast extraction method in a spatial domain and by changing a size of a window for contrast extraction from 3×3 to 43×43. The size of a window (from 3×3 to 43×43) is determined based on the number of pixels of the image sensor. The change in the size of a window is the same in FIGS. 20 and 22.

Referring to FIG. 18, the measurement was performed by using an F-number (aperture value) between 1.8 and 22 and an auto bright function was used in a region of interest. It may be seen from a result of FIG. 18 that, as the F-number decreases, a contrast value of a photographed image decreases. As the F-number increases, the contrast value increases and then decreases after a point where the F-number reaches a maximum. According to the present test condition, using an F-number of about 14 to about 20, for example, about 16, may be advantageous.

Figure 19:
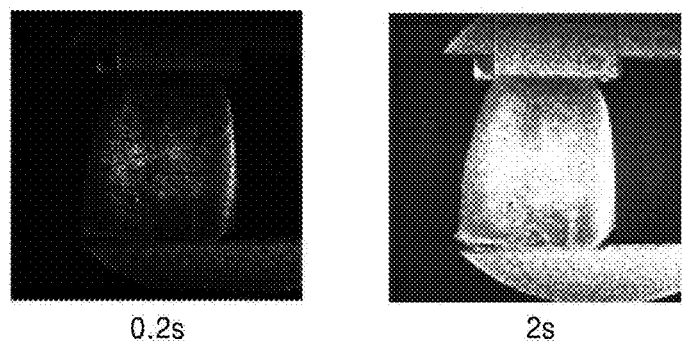
FIG. 19 shows photo images which illustrate an example of how a photographed speckle pattern varies according to an exposure time of a photographing part.

FIG. 19 shows photo images showing an example of how a photographed speckle pattern varies according to an exposure time of a photographing part. The left-side photo image is taken with an exposure time of about 0.2 seconds, whereas the right-side photo image is taken with an exposure time of about 2 seconds. When an exposure time is too short or too long, that is, the light quantity is insufficient or excessive, the speckle contrast value is expected to decrease. The left side and right side photo images of FIG. 19 are taken with the same aperture condition (F-number=f/16).

Figure 20:
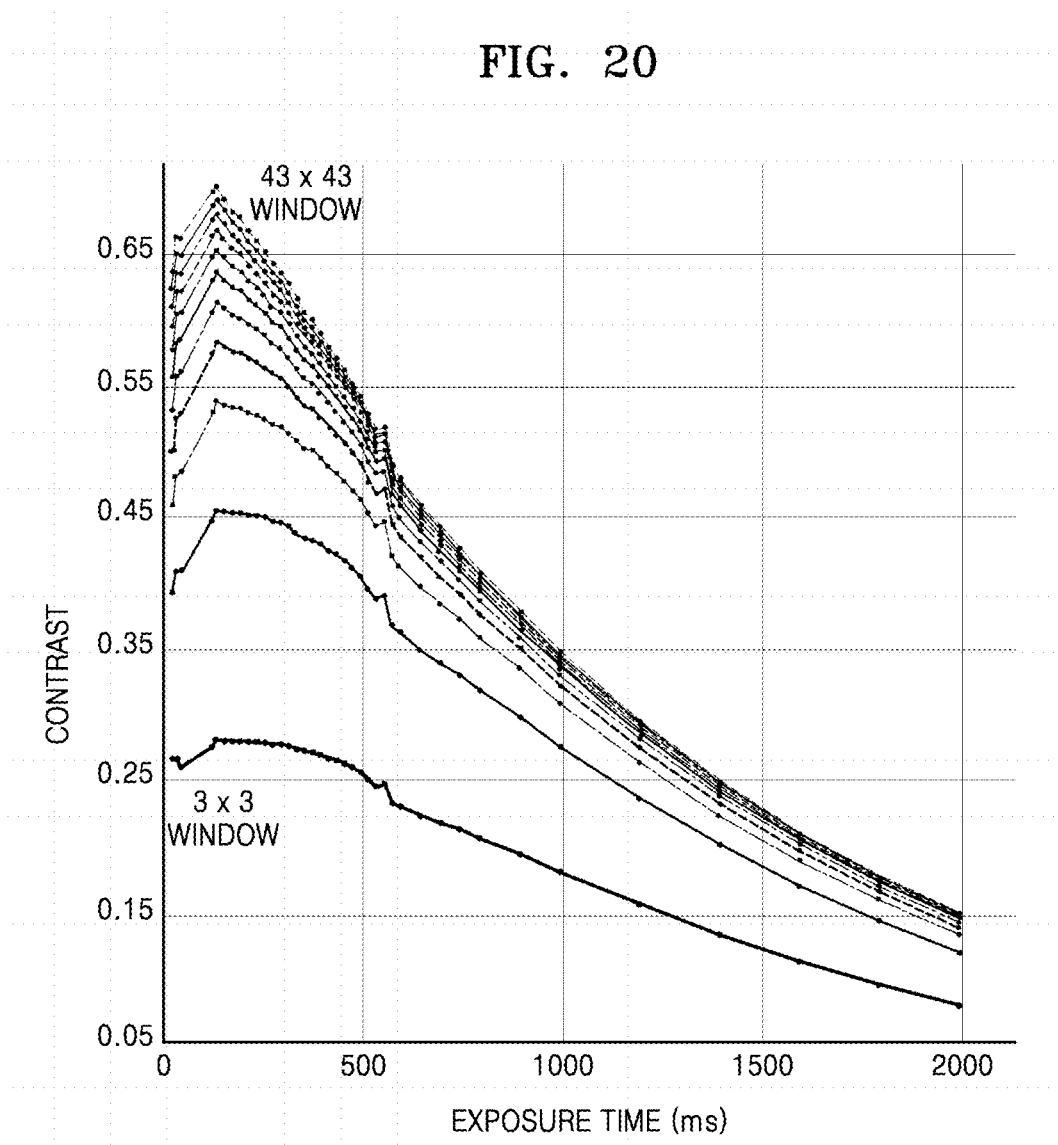
FIG. 20 is a graph showing a result of measurement of a change in a speckle contrast value of an object while changing an exposure time of an optical system used in a photographing part.

FIG. 20 is a graph showing a result of measurement of a change in a speckle contrast value of an object while changing an exposure time of the optical system used in a photographing part.

Referring to FIG. 20, the measurement is performed by using an exposure value between about 30 ms and about 2000 ms, and the contrast value is calculated after setting a region of interest. For a long exposure time, it may be seen from a result of FIG. 20 that the contrast value decreases due to light saturation. For a very short exposure time, the contrast value may decrease due to noise. According to the present test condition, using an exposure time between about 300 ms to about 500 ms may be advantageous.

FIG. 21 shows photo images showing an example of how a photographed speckle pattern varies according to a laser input current. The left-side photo image is taken with a laser input current of about 10 mA, whereas the right-side photo image is taken with a laser input current of about 36 mA. The left- and right-side photo images are taken with the same aperture condition (F-number=f/16).

Figure 22:
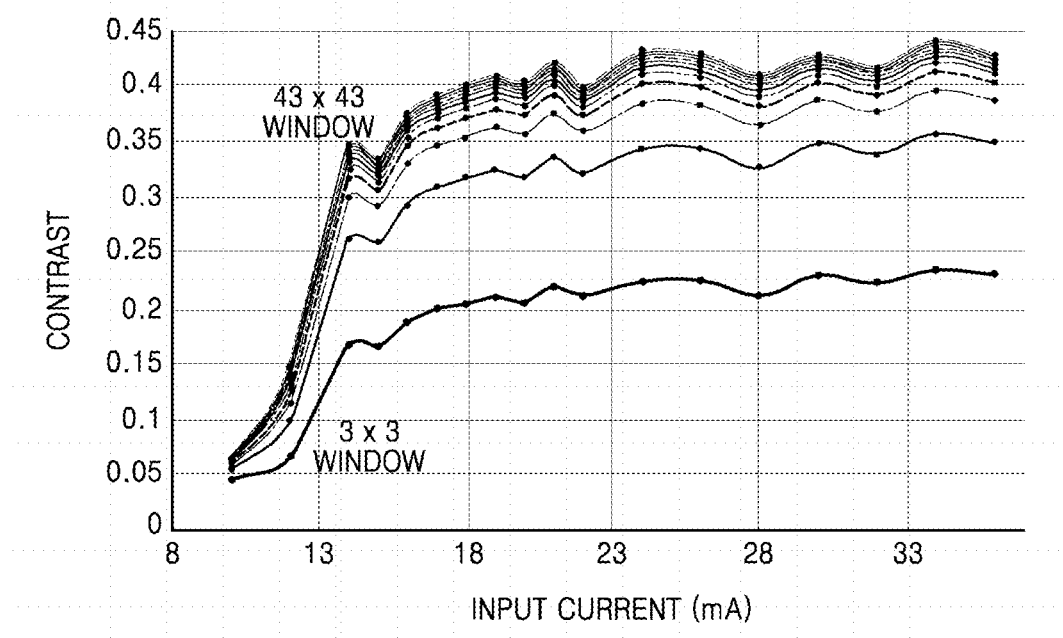
FIG. 22 is a graph showing a result of measurement of a change in a speckle contrast value of an object while changing intensity of laser light used for photographing.

FIG. 22 is a graph showing a result of measurement of a change in a speckle contrast value of an object while changing intensity of laser light used for photographing.

Referring to FIG. 22, the measurement is performed by using a laser input current between about 10 mA to about 35 mA, and a contrast value is calculated after setting a region of interest. It may be seen that the contrast value decreases due to noise at a relatively small current value, and that the contrast value does not change much at a current greater than about 17 mA. According to the present test condition, measuring by using a current of, for example, about 18 mA to about 35 mA, may be appropriate.

Although in the above description the test conditions and the measurement results are described with reference to FIGS. 17 to 22, these are merely provided as examples, and conditions used for actual measurement and evaluation may be variously changed.

The optical measurement apparatuses according to the above-described embodiments, which use a speckle pattern of laser light, may perform non-invasive measurement and perform measurement by a non-contact method or a contact method. Accordingly, the optical measurement apparatuses according to the above-described embodiments may be manufactured to be compact and light and thus may be appropriate for mobile devices or mid- or small-sized devices. Furthermore, the optical measurement apparatus may be easily applied to existing fingerprint recognition systems, by which whether a fingerprint is a fake may be determined simultaneously (or almost simultaneously) while performing fingerprint recognition. Furthermore, since there is no scanning process during measuring/detecting, measurement may be simply and rapidly performed. When the optical measurement apparatus according to the above-described embodiments and the fingerprint authentication system including the same are used, security and reliability may be greatly improved by using a relatively simple apparatus and method.

It should be understood that embodiments described herein should be considered in a descriptive sense only and not for purposes of limitation. Descriptions of features or aspects within each embodiment should typically be considered as available for other similar features or aspects in other embodiments. For example, one of ordinary skill in the related art would understand that the structures of the apparatuses described with reference to FIG. 1 and FIGS. 8 to 11 and the methods (algorithms) described with reference to FIGS. 12 to 14 may be variously modified. In a detailed example, a plurality of light sources (laser sources) may be used in one apparatus, and in some cases, a plurality of imaging device units (image sensors) may be used. Furthermore, the optical measurement apparatus may be applied to various fields. The optical measurement apparatus and method according to the above-described embodiments may be applied to the determination of whether an object is a living body (whether the object is a fake) in an authentication system other than a fingerprint authentication system.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus comprising:
a light source configured to emit coherent light to an object;
an imaging device configured to photograph a speckle image of a speckle pattern generated on the object by the coherent light; and
a processor configured to determine whether the object is a living body or a non-living body based on a contrast value of the speckle pattern,
wherein, when the object comprises skin and blood vessels under skin, the apparatus is configured to determine whether the object is a living body or not from the speckle pattern of a skin surface or a skin tissue of the object, without imaging blood vessels under the skin surface of the object or using a change of the speckle image according to a heartbeat of the object,
wherein, when the speckle image is divided into a plurality of windows, the contrast value is determined according to a standard deviation of a brightness of each of the plurality of windows and an average brightness of the plurality of windows.

2. The apparatus of claim 1, wherein the processor is configured to compare the contrast value of the speckle pattern with a threshold contrast value $K_{th}$ to determine whether the object is a living body or not.

3. The apparatus of claim 2, wherein the processor is configured to determine that the object is a living body when the contrast value of the speckle pattern is less than the threshold contrast value $K_{th}$, and determine that the object is a non-living body when the contrast value of the speckle pattern is greater than the threshold contrast value $K_{th}$.

4. The apparatus of claim 2, wherein the threshold contrast value $K_{th}$ is greater than or equal to about 0.2 and less than or equal to about 0.5.

5. The apparatus of claim 1, wherein the processor is configured to compare the contrast value of the speckle pattern with a reference contrast value registered by a user, and determine that the object is a non-living body when the contrast value of the speckle pattern is two or more times greater than the reference contrast value.

6. The apparatus of claim 1, wherein the coherent light comprises laser and the speckle pattern comprises a laser speckle pattern.

7. The apparatus of claim 1, wherein the apparatus is configured to determine whether a fingerprint of the object is a living body fingerprint or a non-living body fake fingerprint.

8. The apparatus of claim 1, further comprising a fingerprint recognition module that recognizes a fingerprint of the object.

9. The apparatus of claim 8, wherein the fingerprint recognition module is an optical fingerprint recognition module or a capacitive fingerprint recognition module.

10. The apparatus of claim 8, wherein the apparatus is configured to recognize the fingerprint of the object by using the fingerprint recognition module and determine whether the fingerprint of the object is a living body fingerprint or a non-living body fake fingerprint by using the light source, the imaging device, and the processor.

11. The apparatus of claim 1, further comprising at least one of a first optical system disposed between the light source and the object and a second optical system disposed between the object and the imaging device.

12. The apparatus of claim 1, wherein at least a part of the apparatus constitutes a mobile device.

13. The apparatus of claim 1, wherein the processor is further configured to determine whether the object is a fake based on the determination of whether the object is a living body or a non-living body.

14. The apparatus of claim 13, wherein the processor is further configured to determine that the object is a fake in response to the object is being determined as a non-living body.

15. A fingerprint authentication method, the method comprising:
recognizing a fingerprint of an object; and
determining whether the fingerprint is a fake,
wherein the determining whether the fingerprint is a fake comprises:
emitting coherent light to the object by using a light source;
photographing a speckle image of a speckle pattern generated on the object by the coherent light by using an imaging device; and
determining whether the fingerprint is a fake based on a contrast value of the speckle pattern, by using a processor,
wherein, when the object comprises skin and blood vessels under the skin, the fingerprint authentication method is configured to determine whether the object is a living body or not from the speckle pattern of a skin surface or a skin tissue of the object, without imaging blood vessels under the skin of the object or using a change of the speckle image according to a heartbeat of the object, and
wherein, when the speckle image is divided into a plurality of windows, the contrast value is determined according to a standard deviation of a brightness of each of the plurality of windows and an average brightness of the plurality of windows.

16. The method of claim 15, wherein the determining whether the fingerprint is a fake comprises comparing the contrast value of the speckle pattern with a threshold contrast value $K_{th}$.

17. The method of claim 16, wherein the fingerprint of the object is determined to be a real fingerprint in response to the contrast value of the speckle pattern being less than the threshold contrast value $K_{th}$, and the fingerprint of the object is determined to be a fake fingerprint in response to the contrast value of the speckle pattern being greater than the threshold contrast value $K_{th}$.

18. The method of claim 16, wherein the threshold contrast value $K_th$ is greater than or equal to about 0.2 and less than or equal to about 0.5.

19. The method of claim 15, wherein the determining whether the fingerprint is a fake comprises comparing the contrast value of the speckle pattern with a reference contrast value registered by a user, and the fingerprint of the object is determined to be a fake when the contrast value of the speckle pattern is two or more times greater than the reference contrast value.

20. The method of claim 15, wherein the recognizing the fingerprint of the object comprises measuring similarity between the fingerprint of the object and a reference fingerprint.

21. The apparatus of claim 1, wherein the apparatus is configured to control a size of a speckle of the photographed speckle pattern to be two or more times greater than a pixel size of an image sensor included in the imaging device.

22. The method of claim 15, wherein the method is configured to control a size of a speckle of the photographed speckle pattern to be two or more times greater than a pixel size of an image sensor included in the imaging device.

* * * * *